(12) United States Patent
Li

(10) Patent No.: US 6,448,975 B1
(45) Date of Patent: Sep. 10, 2002

(54) AUTOMATICALLY ADJUSTED MAGNIFIER FOR A DISPLAY

(76) Inventor: Chien-Wen Li, 142 Southeast Rd., Tali City, Taichung Hsien (TW)

(*) Notice: Subject to any disclaimer, the term of this patent is extended or adjusted under 35 U.S.C. 154(b) by 0 days.

(21) Appl. No.: 09/543,213

(22) Filed: Apr. 5, 2000

(51) Int. Cl.$^7$ .................................................. G09G 5/26
(52) U.S. Cl. ........................ 345/671; 345/660; 345/184
(58) Field of Search ................................ 345/660, 671, 345/184; 358/76, 451

(56) References Cited

U.S. PATENT DOCUMENTS 5,166,786 A * 11/1992 Sakai et al. .................. 358/76
5,189,529 A * 2/1993 Ishiwata et al. ............. 356/451

* cited by examiner

*Primary Examiner*—Matthew Luu
(74) *Attorney, Agent, or Firm*—Connolly Bove Lodge & Hutz LLP

(57) ABSTRACT

An automatically adjusted magnifier for a display comprises a motor, two movable bases, two breakers, and a magnifier. The movable bases are located at either sides of the motor to connect with the motor by way of gears. Each of the movable bases has a transmission belt driven by the motor via one of the gears and a driving wheel to carry two opposite pulleys moving along a guide rail respectively. Two extensible levers in each movable base have an end thereof pivotally attached to the pulleys respectively and the other end thereof pivotally attached an engaging piece respectively so as to connect with the magnifying glass. Hence, the extensible levers may displace the magnifying glass to a best position to magnify a screen of the display.

2 Claims, 2 Drawing Sheets

AUTOMATICALLY ADJUSTED MAGNIFIER FOR A DISPLAY

BACKGROUND OF THE INVENTION

1. Field of the Invention

The present invention relates to an automatically adjusted magnifier for a display, particularly to a magnifier, which is moved by extensible levers to allow a display behind the magnifier have the screen thereof magnified automatically.

2. Description of Related Art

Conventionally, a magnifier for the screen on a display comprises a magnifying glass, and a fixing frame locating the magnifying glass. The magnifier is placed in front of the display and a user has to adjust the focus of the magnifying glass to magnify the screen of the display. However, the conventional magnifier has the following disadvantages:

1. It is tedious to assemble the magnifying glass and the fixing frame such that engaged parts thereof are easy to be loosened.
2. Because the magnifying glass is fixed manually, it is not possible to align a precise focus.
3. It is not easy to fix the magnifying glass completely and the magnifying glass may occur a distorted position frequently.
4. The magnifier occupies a large space and it is unable to meet a trend of interior design for a limited space.
5. In order to magnify the screen of a display, a manual adjustment has to be performed.

From above mentioned shortcomings, it can be realized that problems existing in the conventional magnifier have to be overcome in spite of offering a basic magnifying function.

SUMMARY OF THE INVENTION

An automatically adjusted magnifier for a display in accordance with the present invention provides two movable bases being located apart. Each of the movable bases comprises two extensible levers actuated by two pulleys moving along a guide rail respectively. One of the movable bases has two breakers on an extensible lever thereof. Once one of the breakers is touched by a pulley thereof will result in the extensible levers carrying a magnifying glass away a display such that the screen on the display can be magnified. When the same pulley touches the other breaker, the extensible levers retreats to their original positions again.

An object of the present invention is to provide an automatically adjusted magnifier for a display in which a focus thereof can be precisely aligned by movable bases automatically.

Another object of the present invention is to provide an automatically adjusted magnifier for a display, which can be retreated to original position automatically while not in use.

A further object of the present invention is to provide an automatically adjusted magnifier for a display with which the magnifying glass can be fixed firmly to prevent from a distorted position and loosened parts.

BRIEF DESCRIPTION OF THE DRAWINGS

The present invention can be more fully understood in the following description with reference to accompanying drawings, in which.

DETAILED DESCRIPTION OF THE PREFERRED EMBODIMENTS

Figure 1:
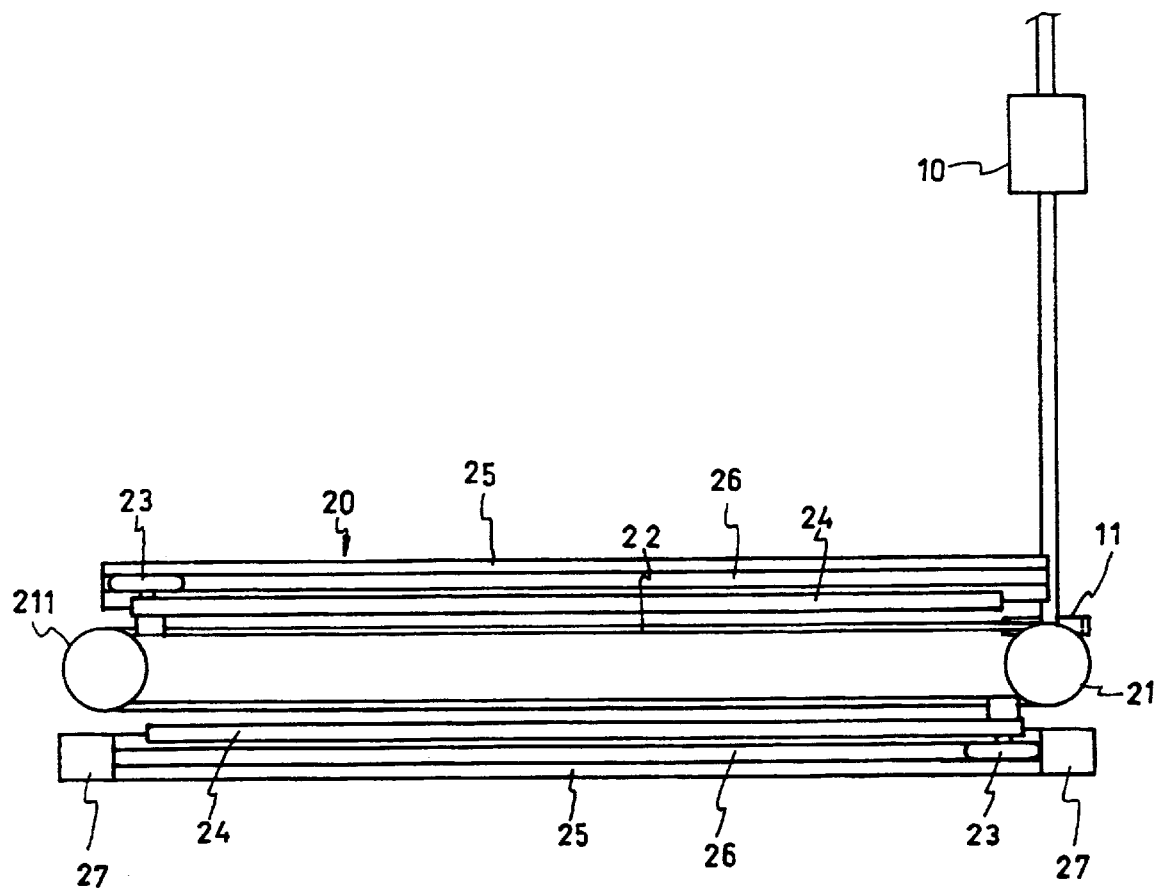
FIG. 1 is a plan view of an automatically adjusted magnifier for a display in a preferred embodiment of the present invention illustrating one movable base thereof.
Figure 2:
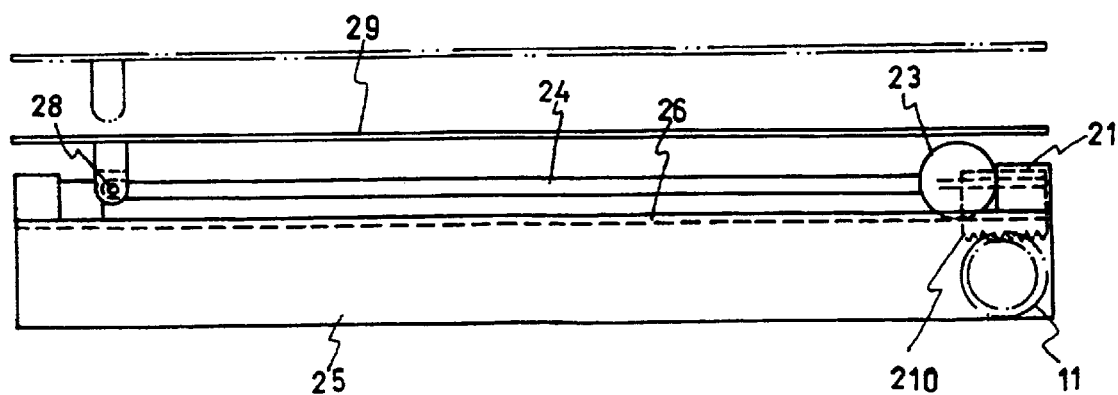
FIG. 2 is side view of automatically adjusted magnifier for a display shown in FIG. 1.
Figure 3:
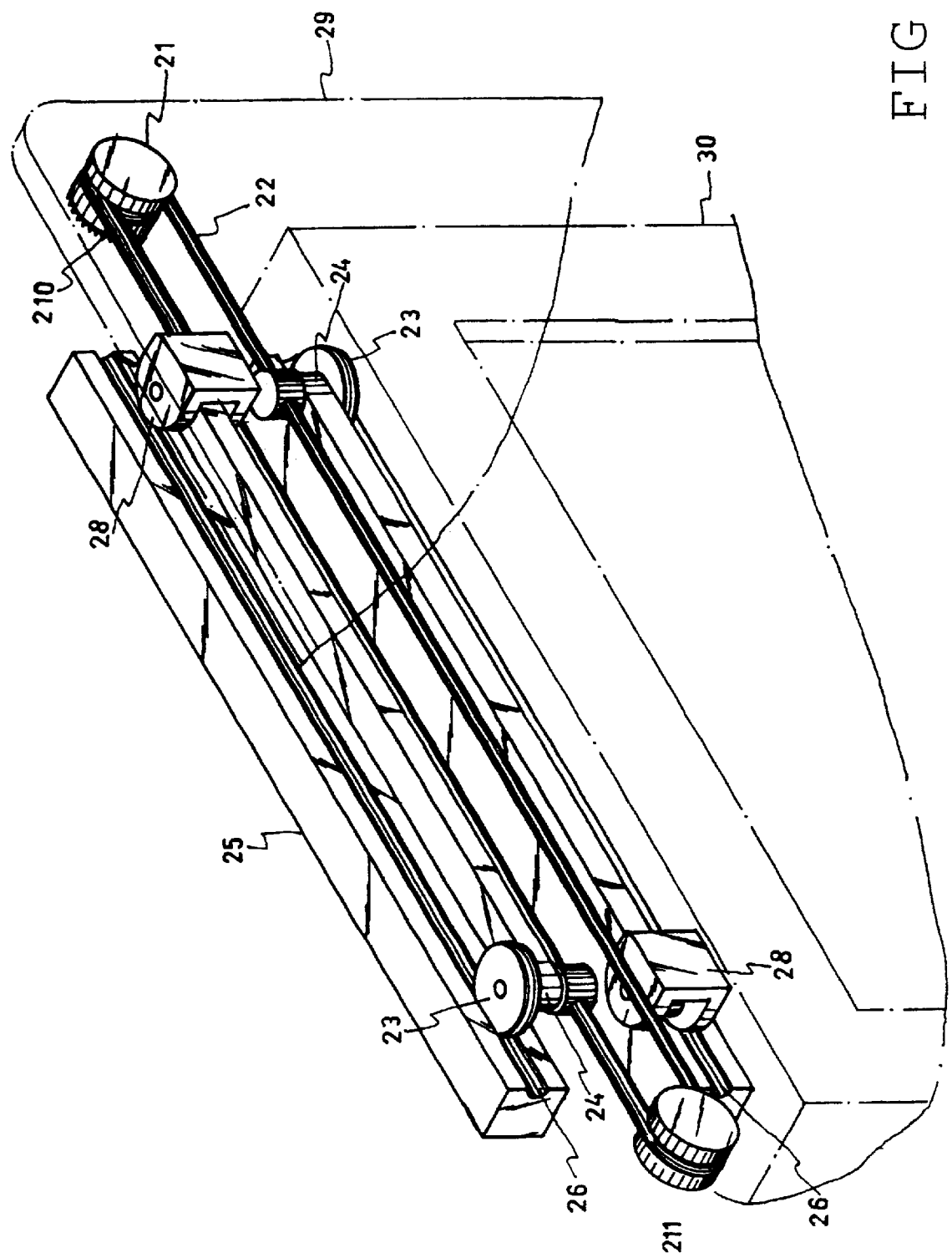
FIG. 3 is a perspective view of automatically adjusted magnifier for a display shown in FIG. 1 illustrating the movable base.

Referring to FIGS. 1, 2, and 3, a respective movable base 20 is provided to be disposed by either side of a motor 10, wherein a respective gear 11 is mounted at either side of the motor 10 to drive the movable bases 20 synchronously. It is noted that a movable base 20 is shown in the figures only. Each movable base 20 comprises a driving wheel 21, a driven wheel 211, an endless transmission belt 22, two pulleys 23, two parallel guide rails 25, two extending levers 24, and two engaging pieces 28. The driving wheel 21 is provided with a teeth part 210 at a lateral side thereof to engage with the gear 11 so as to be rotated by the gear 11. Both the driving gear 21 and the driven gear 211 are disposed apart to each other and connected by the transmission belt 22. The pulleys 23 are attached on the transmission belt 22 and disposed near the driving wheel 21 and the driven wheel 211 respectively so as to be opposite to each other diagonally. The guide rails 25 are disposed beside the pulleys 23 and each guide rail 25 has a guide groove 26 along the longitudinal direction of the guide rail 25 to guide the pulley 25 moving along respectively. One of the guide rails 25 at both ends thereof has a breaker 27 to be touched by the corresponding pulley 23 on the guide rail 25 while the corresponding pulley 23 moves along the guide rail 25. The respective breaker 27 is actuated to be in a state of OFF such that the motor 10 is controlled to stop running. The extensible levers 24 are disposed oppositely beside the transmission belt 22 and each extending lever 24 at an end thereof is pivotally attached to the pulleys 23 respectively. The engaging pieces 28 each are attached to the other end of the respective extensible lever 24 to engage with a magnifying glass 29. Once the extensible levers 24 are actuated to move, the magnifying glass 29 may displace with respect to the screen of a display to adjust the focus of the magnifying glass 29. It is noted that the breakers 27 are mounted in one of the two movable bases 20 only.

The operation of the magnifier of the present invention will be described hereinafter. The motor 10 rotates the gear 11 to drive the driving wheel 21 while the power is turned on such that each of the pulleys 23 on the transmission belt 22 is moved along the guide groove 26 on the respective guide rail 25. Thus, each of the extensible levers 24 is pushed to move outward gradually and the respective engaging pieces 28 at the other end of the respective extensible lever 24 pushes the magnifying glass 29 away the display 30 a distance. When one of the breakers 27 is touched by the corresponding pulley 23, the motor 10 is stopped from rotating and the movable bases 20 at both sides of the motor 10 are stopped. At right this moment, the magnifying glass 29 is disposed to keep a best focus with respect to the display 30 and the screen on the display 30 is magnified. In the meantime, the motor 10 is ready to change the rotational direction after one of the breakers 27 has been touched. Because the motor 10 can rotate inversely is a prior art in the field of electronic circuit control, no further detail will be explained.

When the power source is turned on again, the motor 10 is turned inversely to actuate the pulleys 23 moving inversely along the guide rails 25 respectively. In this way, the extensible levers 24 are moved back to the original positions again and the magnifying glass 29 is moved close to the display 30 till the motor 10 is stopped in case of the other breaker 27 being touched by the same pulley 23. Thus, the screen on the display 30 is not magnified. If a magnified screen is needed, the motor 10 can be started to turn and above said procedure is repeated to move the extensible levers 24 again.

In addition, an extensible casing can be used to receive the magnifier of the present invention and the extensible casing may extend and retreat synchronously with the magnifier. Therefore, the magnifier of the present invention can be fixed to the display secretly in the casing such that an integral and beautiful appearance of the casing will be seen only from outside. The conventional way used in articles such as an extensible antenna, an extensible fish pole, and etc. can be applied to design the extensible casing.

While the invention has been described with reference to a preferred embodiment, it is to be understood that modifications and variations may be easily made without departing from the spirit of this invention defined by the appended claims.

What is claimed is:

1. An automatically adjusted magnifier for a display, comprising a motor with two sides along an axial direction thereof, engaging with a gear at both sides thereof respectively;

two movable bases, being actuated by the gears respectively;

two breakers, being disposed on one of the movable base; and a magnifying glass with two neighboring corners, the two neighboring corners thereof connecting with said two movable bases;

wherein each of the movable bases further comprising a driving wheel with a lateral side, having a gear part at the lateral side engaging with one of the gears at both sides of the motor;

an endless transmission belt, enclosing the driving wheel;

a driven wheel, being disposed a distance apart from the driving wheel, and being enclosed by the transmission belt so as to be received a turning force from the motor;

two pulleys, being attached to the transmission belt, and being disposed oppositely and diagonally to each other;

two parallel guide rails, having a guide groove thereon to contact the pulleys respectively and to allow the pulleys moving along;

two extensible levers, each of the levers having two ends, an end thereof pivotally engaging with the pulleys respectively; and two engaging pieces, each of the engaging pieces being pivotally attached at the other end of each of the extensible levers, and fixing with the magnifying glass;

whereby, when the motor starts to run, the turning force is transmitted to the respective belt through the respective gear, the respective driving wheel, and the respective driven wheel such that the respective pulley moves along the respective guide groove to extend the respective extensible levers till one of the pulleys touching one of the breakers so as to displace the magnifier a best location for magnifying the display.

2. An automatically adjusted magnifier for a display according to claim 1, wherein the breakers are located on one of the guide rails at both end thereof.

* * * * *